(12) United States Patent
Batchu et al.

(10) Patent No.: US 12,088,582 B2
(45) Date of Patent: *Sep. 10, 2024

(54) SECURE ACCESS VIA REMOTE BROWSER ISOLATION

(71) Applicant: Ivanti, Inc., South Jordan, UT (US)

(72) Inventors: Suresh Kumar Batchu, Campbell, CA (US); Ivan Golovenko, Mountain View, CA (US); Jian Liu, Fremont, CA (US)

(73) Assignee: Ivanti, Inc., South Jordan, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/960,471

(22) Filed: Oct. 5, 2022

(65) Prior Publication Data
US 2023/0022478 A1 Jan. 26, 2023

Related U.S. Application Data

(63) Continuation of application No. 16/826,997, filed on Mar. 23, 2020, now Pat. No. 11,496,464.

(60) Provisional application No. 62/951,483, filed on Dec. 20, 2019.

(51) Int. Cl.
*H04L 9/40* (2022.01)

(52) U.S. Cl.
CPC ........ *H04L 63/083* (2013.01); *H04L 63/0876* (2013.01); *H04L 63/0884* (2013.01)

(58) Field of Classification Search
CPC ............... H04L 63/083; H04L 63/0876; H04L 63/0884
USPC ............................................................ 726/4
See application file for complete search history.

(56) References Cited

U.S. PATENT DOCUMENTS

2014/0143137 A1\* 5/2014 Carlson .................. G06Q 20/18
705/39

\* cited by examiner

*Primary Examiner* — Anthony D Brown
(74) *Attorney, Agent, or Firm* — Van Pelt, Yi & James LLP

(57) ABSTRACT

Techniques to provide secure access to a service via an unmanaged device are disclosed. In various embodiments, a request from an unmanaged device to access a service is received via a communication interface. A user associated with the request is authenticated at least in part by prompting the user to use a managed device associated with the user to interact with data displayed at the unmanaged device. Access to the service is provided via the unmanaged device at least in part via a virtual browser instance running on a secure node and configured to access the service on behalf of the user and stream data associated with the service to the unmanaged device.

24 Claims, 5 Drawing Sheets

SECURE ACCESS VIA REMOTE BROWSER ISOLATION

CROSS REFERENCE TO OTHER APPLICATIONS

This application is a continuation of U.S. patent application Ser. No. 16/826,997, entitled SECURE ACCESS VIA REMOTE BROWSER ISOLATION filed Mar. 23, 2020 which is incorporated herein by reference for all purposes, which claims priority to U.S. Provisional Application No. 62/951,483, entitled SECURE ACCESS VIA REMOTE BROWSER ISOLATION filed Dec. 20, 2019 which is incorporated herein by reference for all purposes.

BACKGROUND OF THE INVENTION

Enterprise and other users of cloud-based services may desire to use managed and unmanaged devices to access the service. For example, a user may use mobile device, such as a smart phone, that is managed by an enterprise mobility management (EMM) solution. The EMM solution may include features to authenticate the user (e.g., using biometric functionality of the device, user-entered credentials, etc.) and to verify the identity and security posture of the device.

A managed device can be used, in various ways, to provide a degree of security when a user attempts to access enterprise data via an unmanaged device. For example, if a user requests access from an unmanaged device and/or browser, a QR or other optical code can be displayed. If the user scans the code with the managed device, the identity of the user can be established. However, the security posture of the unmanaged device is not assured. For example, malware on the unmanaged device could result in protected information being compromised. Even in the absence of malware, it may not be desirable for a user to download sensitive information to the unmanaged device.

BRIEF DESCRIPTION OF THE DRAWINGS

Various embodiments of the invention are disclosed in the following detailed description and the accompanying drawings.

DETAILED DESCRIPTION

Figure 1:
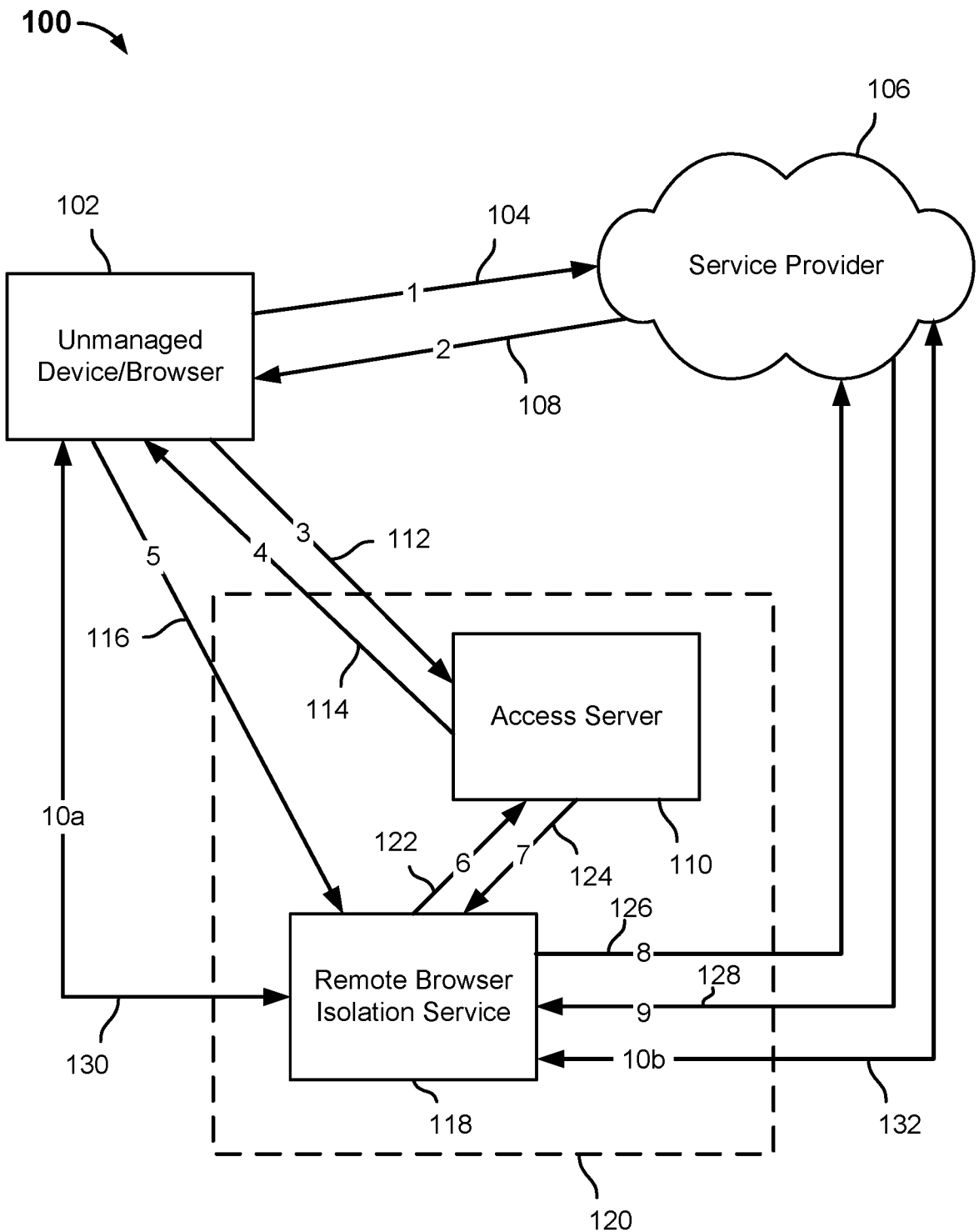
FIG. 1 is a block diagram illustrating an embodiment of a system to provide access to a service via an unmanaged device and/or browser.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques are disclosed to use remote browser isolation to provide limited and/or managed access to a cloud-based service and associated data via an unmanaged device. In various embodiments, a user is authenticated via a managed device, such a managed mobile device. A credential associated with the user may be cached. The user requests access to a cloud-based service via an unmanaged device and/or browser. The cached credential is used to establish a connection to the service from a remote browser instance running on a trusted node (i.e., one that is managed and the security posture of which is known). The remote browser instance relays information associated with the service to the unmanaged device/browser from which the access request originated. In various embodiments, information is streamed to the unmanaged device/browser, such that copies of data associated with the service are not stored at the unmanaged device/browser. In various embodiments, policies may be applied at the node at which the remote browser is running to limit the data that is made available to the user via the remote browser.

FIG. 1 is a block diagram illustrating an embodiment of a system to provide access to a service via an unmanaged device and/or browser. In the example shown, system 100 includes an unmanaged device/browser 102, used in the example shown to send a service access request 104 to a cloud-based service 106, e.g., Salesforce.com™ or any other cloud-based service. The service 106 sends a response 108 to redirect the unmanaged device/browser 102 to an access server 110 by sending a redirected access request 112. In various embodiments, the request 104 may be redirected (108) directly to the access server 110 or indirectly via one or more intermediate nodes, such as a third party identity provider, not shown in FIG. 1.

In various embodiments, the access server 110 recognizes the redirected request 112 as coming from an unmanaged device/browser 102. In some embodiments, a request from a device managed by access server 110 and/or an enterprise mobility management service and/or solution with which access server 110 is associated, would be processed other than as shown in FIG. 1. For example, in some embodiments, a request received from a managed device would be received via a secure tunnel from the managed device to the access server 110. The access server 110 would associate the request with a user and device with which the tunnel is associated and would grant access to the service 106 based on the identity of the user, authenticated previously in connection with establishment of the tunnel and the device posture of the managed device associated with the tunnel. In some embodiments, access server 110 recognizes a request received other than via a secure tunnel, as in the example shown in FIG. 1, as being a request from an unmanaged device/browser, such as request 112 from unmanaged device/browser 102, at least in part by the fact that the request (e.g., 112) is received other than via a secure tunnel.

Referring further to FIG. 1, in various embodiments, access server 110 responds to request 112 with a response 114 that includes a challenge to authenticate the requesting user via a managed device. For example, in some embodiments, access server 110 causes a QRC or other optical code to be displayed by the unmanaged device/browser 102, together with instructions to scan the code using a managed device. If in response the user scans the code with a managed device associate with access code 110, access code 110 determines/authenticates the identity of the user with which the request 112 is associated based on data received from the managed device in response to the user scanning the code with the managed device. Once the user has been authenticated, the access node send (e.g., in a subsequent response 114) to the unmanaged device/browser 102 a communication that further redirects the unmanaged device/browser 102 to send a request 116 to establish a connection with a remote browser isolation (RBI) service instance 118. The RBI instance 118 may be a modified and/or sandboxed or otherwise secure and isolated instance of a browser software, such as Firefox™. If an instance of the RBI service instance 118 does not already exist, e.g., in connection with a previous request from the same user to access another service using the unmanaged device/browser 102, the access server 110 creates the RBI service instance 118, e.g., prior to sending the response 114.

In various embodiments, the response 114 comprises a communication to auto-post to the RBI service instance 118 an authorization token and associated context (e.g., identity of service 106 to be accessed, user identity, user privilege level and/or role with respect to service 106, etc.). In various embodiments, the request 116 from the unmanaged device/browser 102 to the RBI service instance 118 comprises a POST of the authorization token and context data. In response, RBI service instance 118 initializes a virtual browser session between the unmanaged device/browser 102 and the RBI service instance 118.

In the example shown, the RBI service instance 118 posts authentication context information to the access server via communication 122 and in response receives via response 124 an assertion (e.g., a SAML assertion) or other credential to be provided to access the service 106 on behalf of the requesting user. In some embodiments, the response 124 optionally sets a user-identifying cookie. In some embodiments, the cookie may be used to provide the same user with access to other services with the same RBI service instance 118, e.g., without requiring the user to again scan a QRC or other code, etc. In some embodiments, a cookie is not set.

In the example shown, RBI service instance 118 posts the (SAML) assertion or other credential to the service provider 106 via a communication 126 and the service 106 issues a session cookie 128, setting up a session between the RBI service instance 118 and the service provider 106 in which the RBI service instance 118 has access to the service 106 on behalf of the requesting user.

In various embodiments, the session is used to provide access to service 106 via streaming (e.g., HTML streaming) 130, which ensures protected/sensitive data is not stored at the unmanaged device/browser 102. The service is accessed normally on behalf of the user via communications 132 between the RBI service instance 118 and service 106. Inputs from the user are received via browser and/or user interface interactions at unmanaged device/browser 102 and sent to the RBI service instance 118 via communications 130. The RBI service instance 118 forwards data and commands/request to the service 106 via communications 132, receives responsive data via responsive communications 132, and streams the response data via communications 130 for display at the unmanaged device/browser 102.

In some embodiments, access server 110 and/or RBI service instance 118 may be configured to implement policy and/or rule-based restrictions on data access via the unmanaged device/browser 102. For example, in some embodiments, only a subset of data and/or functionality of service 106 that the user would be able to access via a managed device would be made available via the unmanaged device/browser 102 using the approach as shown in FIG. 1. For example, in some embodiments data having a certain tag (e.g., "highly sensitive") and/or other metadata associated with the data may be filtered out of results received via communications 132 and only a resulting filtered subset of data may be streamed to the unmanaged device/browser 102 via communications 130. In some embodiments, requests received via communications 130 may be evaluated and/or filtered to exclude, modify, or refuse requests that are not permitted by an applicable policy, rule, or other configured data.

In various embodiments, one or more policies, rules, etc. may be configured and/or provided by an Enterprise Mobility Management (EMM) server, service, and/or solution. The EMM provider may manage a set of managed devices for an enterprise, for example, and in addition may manage access to services via unmanaged devices, as disclosed herein.

In some embodiments, a policy, rule, configuration data, etc. may indicate that unmanaged devices may be allowed to access one or more services directly, without using the remote browser isolation (RBI) techniques disclosed herein, while requiring RBI-based techniques disclosed herein to be used to access one or more other services, such as services considered to be more sensitive, etc.

Figure 2:
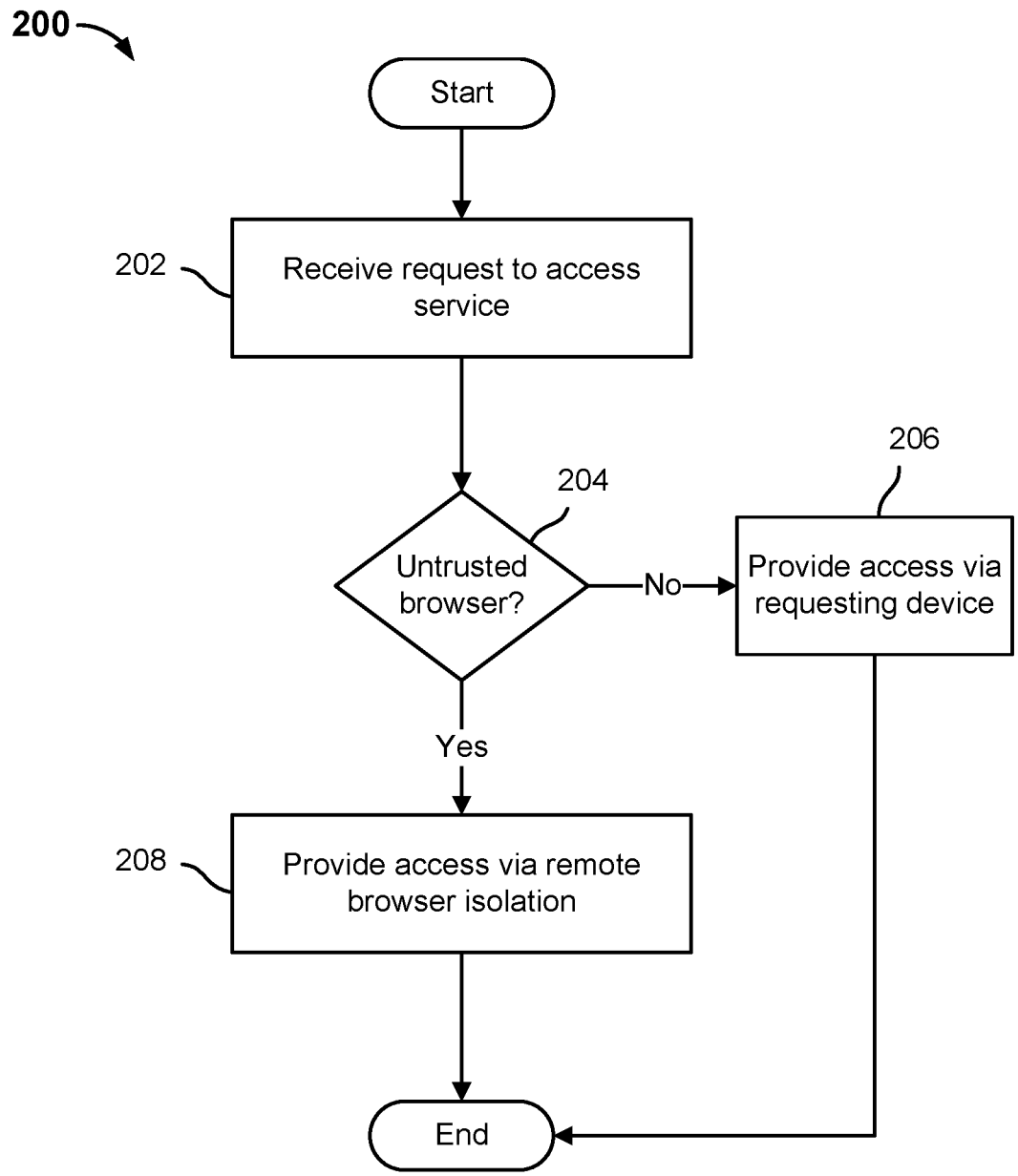
FIG. 2 is a flow chart illustrating an embodiment of a process to provide access to a service via an unmanaged device and/or browser.

FIG. 2 is a flow chart illustrating an embodiment of a process to provide access to a service via an unmanaged device and/or browser. In various embodiments, the process 200 of FIG. 2 is implemented by an access node, such as access server 110 of FIG. 1. In the example shown, at 202, a request to access a service, such as request 112 of FIG. 1, is received. It is determined, at 204, whether the request is associated with an untrusted browser. For example, the determination may be made based at least in part on whether the request was received via a secure tunnel associated with a managed device. If the request is determined to be associated with a trusted browser, such as a browser running on a managed device, at 206 access to the service is provided via the requesting device. For example, a SAML assertion or other credential to access the service may be sent to the requesting device. If the request is determined at 204 to be associated with an untrusted browser, access is provided at 208 via remote browser isolation, e.g., as described above in connection with FIG. 1. For example, the user may be authenticated via a managed device, and if the user is authenticated successfully access via is provided via remote browser isolation.

Figure 3:
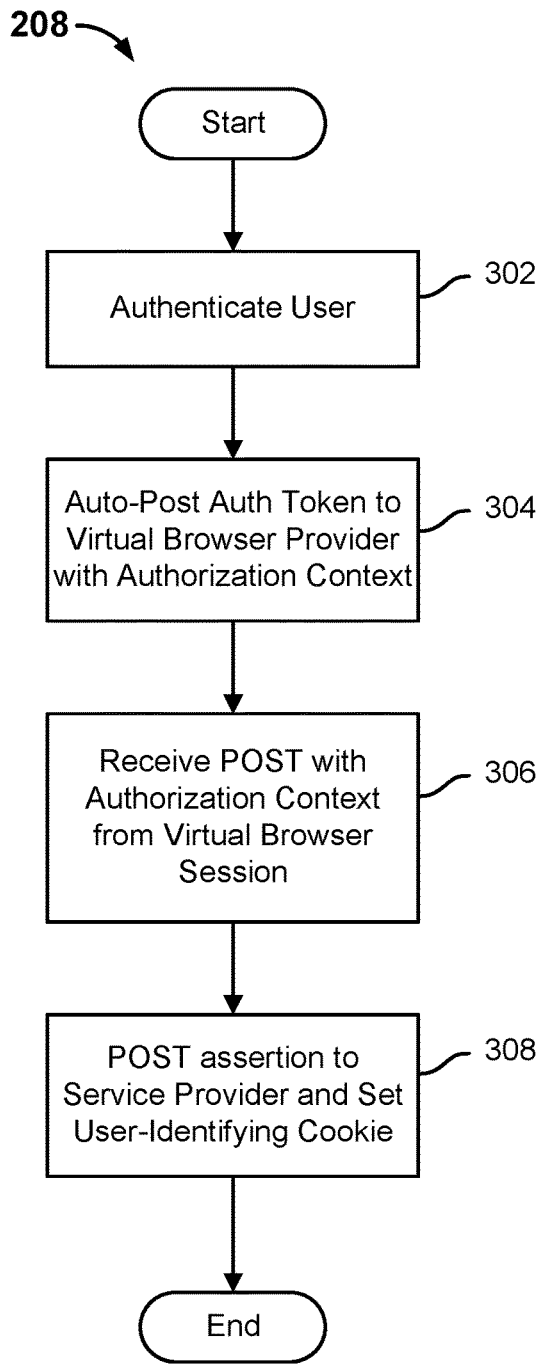
FIG. 3 is a flow chart illustrating an embodiment of a process to provide access to a service via remote browser isolation.

FIG. 3 is a flow chart illustrating an embodiment of a process to provide access to a service via remote browser isolation. In various embodiments, the process of FIG. 3 implements step 208 of the process of FIG. 2. In various embodiments, the process of FIG. 3 is performed by an access node, such as access server 110 of FIG. 1. In the example shown, at 302, the user is authenticated. For example, the user may be prompted to use a managed device associated with the user to scan a QRC or other optical code displayed via the untrusted browser. If the user passes authentication, at 304 an auto-post communication is sent to the request (untrusted) browser, the communication including an authorization token and authorization context data to be posted to a virtual browser provider, such as remote browser isolation service 118 of FIG. 1. In some embodiments, at 304 the authorization context data is not posted to the virtual browser provider, and instead a reference to the authorization context data as stored on the access server is sent. At 306, a POST communication comprising all or part of the authorization context data is received from a virtual browser session associated with the service access request. In response, at 308, a POST communication comprising a SAML (or other) assertion (or other credential) to access the service is sent to the virtual browser session and (optionally) a user-identifying cookie is set. In some embodiments, the cookie is used to provide the same user with access to other services without requiring, for example, that the user again be authenticated as in 302.

Figure 4:
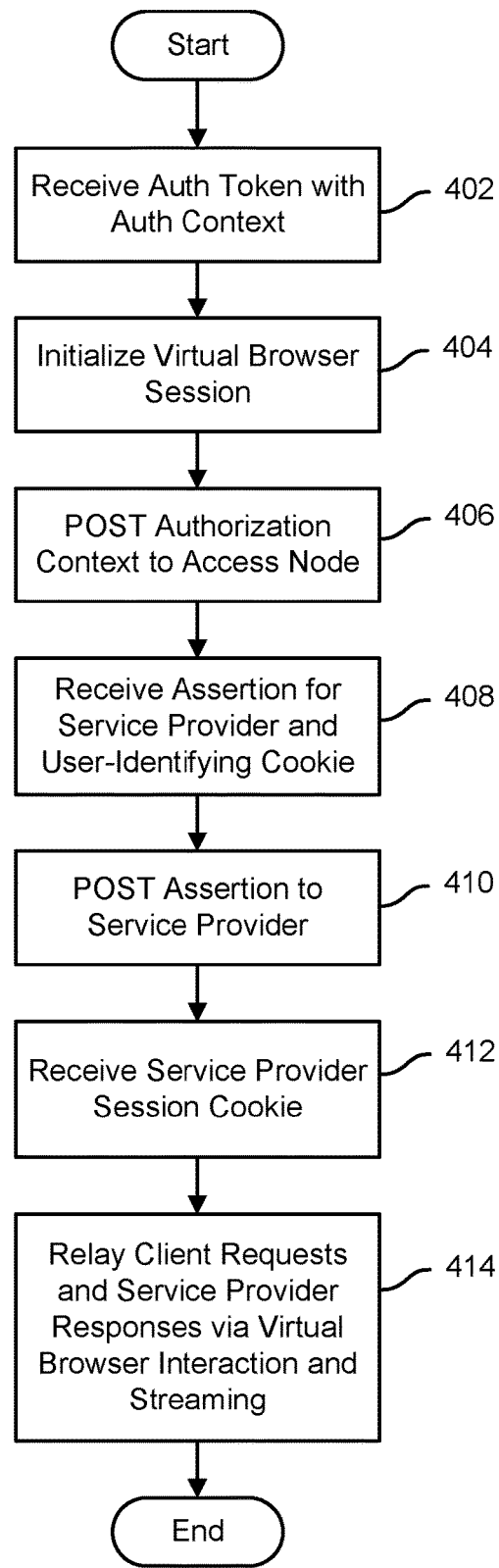
FIG. 4 is a flow chart illustrating an embodiment of a process to provide access to a service via remote browser isolation.

FIG. 4 is a flow chart illustrating an embodiment of a process to provide access to a service via remote browser isolation. In various embodiments, the process of FIG. 4 is performed by a remote browser isolation service node, such as remote browser isolation service 118 of FIG. 1. In the example shown, at 402, an authorization token and authorization context data are received, e.g., from an access node, such as access server 110 of FIG. 1. At 404, a virtual browser session is initialized (in some embodiments if not already present, e.g., to provide the same user with access to another service). At 406, the authorization context data is posted to the access node. At 408, a SAML or other assertion (or other credential) to access the service provider and (optionally) a user-identifying cookie are received. At 410, the assertion (or other credential are posted to the service provider. A session cookie is received from the service provider at 412. At 414, client requests and service provider responses are relayed via virtual browser interaction with the service provider and streaming to/from the requesting client/browser.

Figure 5:
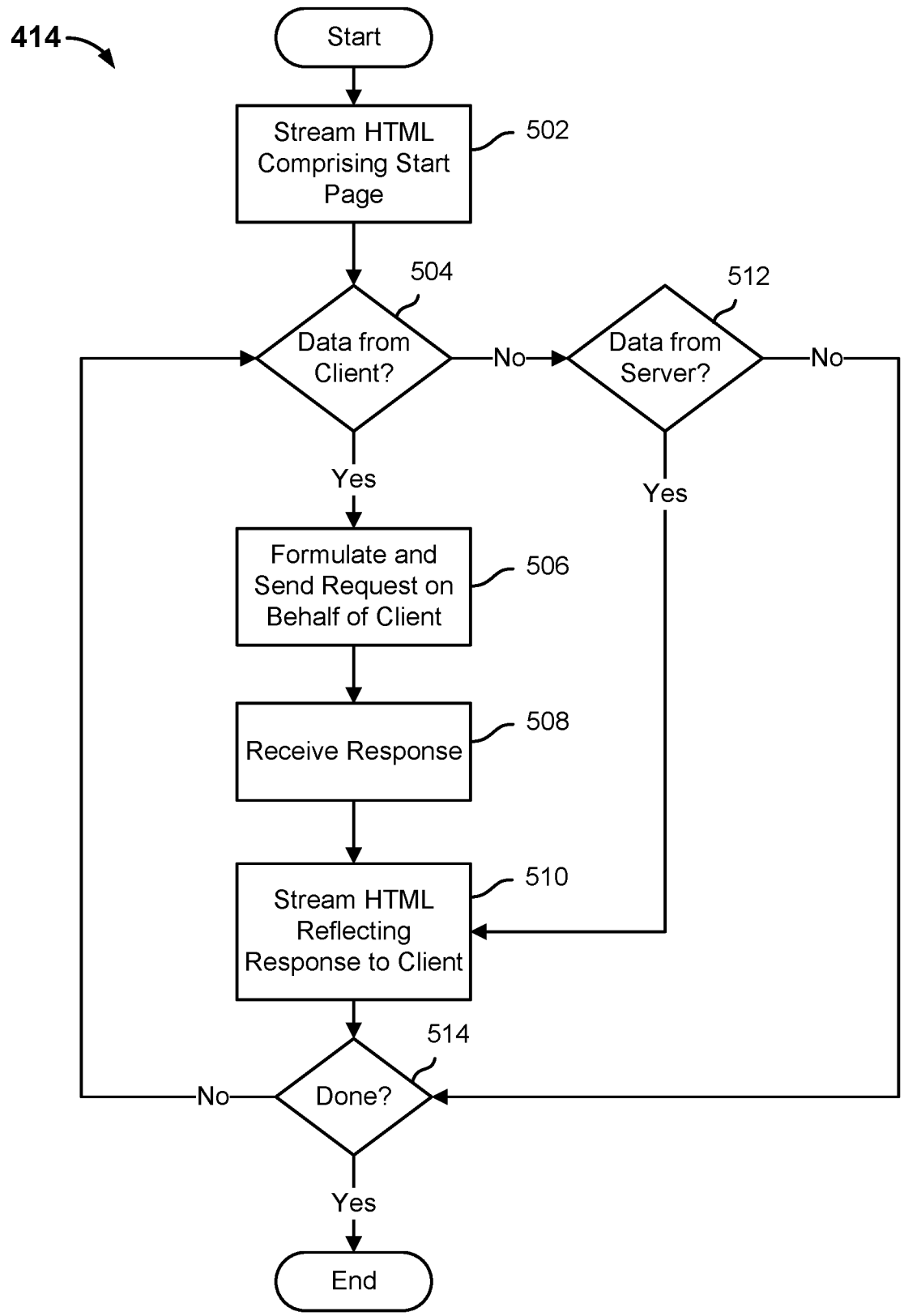
FIG. 5 is a flow chart illustrating an embodiment of a process to provide access to a service via an unmanaged device and/or browser.

FIG. 5 is a flow chart illustrating an embodiment of a process to provide access to a service via an unmanaged device and/or browser. In various embodiments, the process of FIG. 5 implements step 414 of the process of FIG. 4. In the example shown, at 502, HTML comprising a landing or "start" page of the service is streamed to the requesting client. If data is received from the requesting client (504), a request to the service provider is generated and sent to the service provider on behalf of the client (506). A response is received (508) from the service provider and HTML reflecting the response is streamed (510) to the requesting client, e.g., for display at the client. If data is received from the service provider (512), HTML reflecting the data is streamed to the client (510). Processing continues as described above until done (514), e.g., the user terminates the service access and/or virtual browser session.

Figure 6:
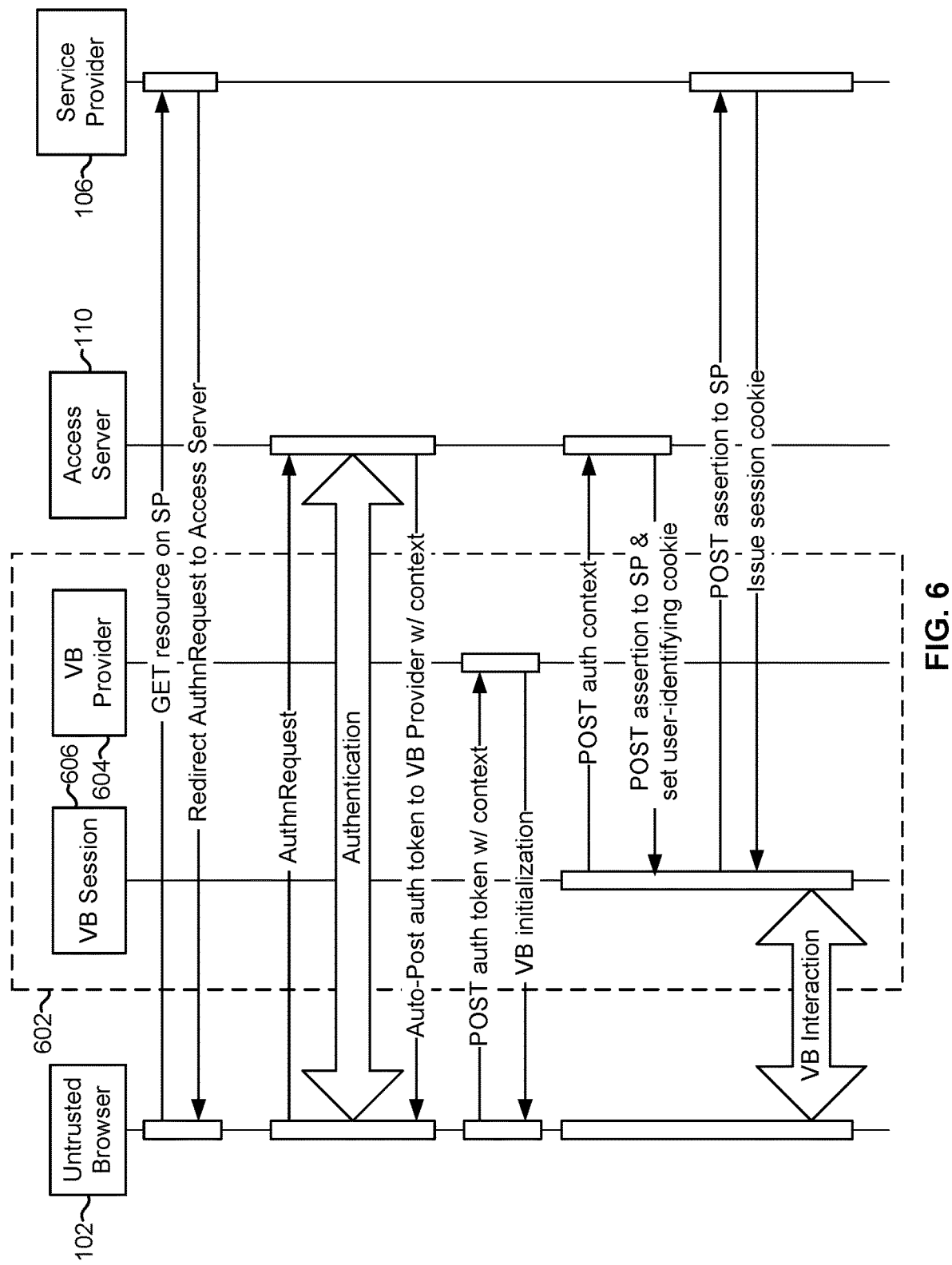
FIG. 6 is a block diagram illustrating an embodiment of a system to provide access to a service via an unmanaged device and/or browser.

FIG. 6 is a block diagram illustrating an embodiment of a system to provide access to a service via an unmanaged device and/or browser. In the example shown, untrusted browser 102 of FIG. 1 is used to send a request to access a service associated with service provider 106; and is redirected to the access server 110. The untrusted browser 102 sends the authentication request to access server 110 and completes authentication (e.g., user uses managed device to scan a code displayed at the untrusted browser 102), after which an auto-post to a virtual browser provider, comprising an authorization token and context, is sent to the untrusted browser 102. The authorization token and context are posted to a remote browser isolation service 602 comprising a virtual browser provider 604 and virtual browser session(s) 606. In the example shown, virtual provider 604 receives the posted authorization token and context data (or reference thereto) and in response initializes virtual browser session 606. Virtual browser provider 604 posts the authentication context data (or reference thereto) to the access server 110 and receives in response a POST communication to the service provider comprising a SAML (or other) assertion and (optionally) a user-identifying cookie. The virtual browser session 606 posts the SAML assertion to the service provider 106, which in return issues a session cookie. The session between the virtual browser session 606 and the service provider 106 is used to provide access to the service via virtual browser interactions (e.g., HTML streaming) between the virtual browser session 606 and the untrusted browser 102.

In various embodiments, techniques disclosed herein enable access to be provided to a service via an untrusted browser/device securely, even though the security posture of the untrusted browser/device is not known.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system to provide access to a service, comprising:
a communication interface configured to receive a request from an unmanaged device to access a service; and
a processor coupled to the communication interface and configured to:
authenticate a user associated with the request at least in part by prompting the user to use a managed device associated with the user to interact with data displayed at the unmanaged device;
in response to authenticating the user, cause the unmanaged device to send a request to establish a connection with a virtual browser instance running on a secure node; and
provide access to the service via the unmanaged device at least in part via the virtual browser instance running;
wherein the virtual browser instance comprises a secure and isolated instance of a browser software and the virtual browser instance is configured to access the service on behalf of the user, receive responsive data from the service, and stream to the unmanaged device content data comprising a subset of the responsive data.

2. The system of claim 1, wherein the unmanaged device comprises an unmanaged desktop or laptop computer.

3. The system of claim 1, wherein the unmanaged device comprises an untrusted browser.

4. The system of claim 1, wherein the processor is further configured to determine that the unmanaged device is not managed.

5. The system of claim 4, wherein the determination that the unmanaged device is not managed is based at least in part on a determination that the request did not arrive via a secure tunnel associated with the managed device.

6. The system of claim 1, wherein the user is authenticated at least in part by causing a QRC or other optical code to be displayed via the unmanaged device and prompting the user to scan the code using the managed device.

7. The system of claim 1, wherein access to the service is provided at least in part by auto-posting an authorization token to a virtual browser provider.

8. The system of claim 7, wherein the auto-post communication includes context data associated with one or more of the unmanaged device, the user, the service, and the request.

9. The system of claim 8, wherein the processor is further configured to receive at least a portion of the context data from the virtual browser instance.

10. The system of claim 1, wherein the processor is further configured to provide to the virtual browser instance a SAML assertion or other credential to access the service on behalf of the user.

11. The system of claim 1, wherein the processor is further configured to set at the virtual browser instance a user-identifying cookie associated with the request.

12. The system of claim 11, wherein the service comprises a first service and the virtual browser instance is configured to use the user-identifying cookie to provide the user with access to a second service via the virtual browser instance.

13. The system of claim 1, wherein the processor is further configured to provide to the virtual browser instance a SAML assertion or other credential to access the service on behalf of the user and the virtual browser instance is configured to use the SAML assertion or other credential to access the service on behalf of the user.

14. The system of claim 1, wherein the virtual browser instance is configured to provide access to the service via remote browser isolation.

15. The system of claim 1, wherein the virtual browser instance is configured to provide access to the service at least in part by streaming to the unmanaged device HTML, or other data comprising data received from the service.

16. The system of claim 1, wherein the virtual browser instance is configured to provide access to the service at least in part by receiving and processing service-related commands entered by the user at the unmanaged device via a page associated with the service displayed at the unmanaged device.

17. The system of claim 1, wherein the processor is further configured to filter service-related data received from the service to exclude at least a subset of service-related data from being provided to the unmanaged device.

18. The system of claim 1, wherein the processor is further configured to filter service-related data based at least in part on one or more of a policy, a rule, a context data, and a configuration data.

19. A method to provide access to a service, comprising:
receiving via a communication interface a request from an unmanaged device to access a service; and
using a processor to:
authenticate a user associated with the request at least in part by prompting the user to use a managed device associated with the user to interact with data displayed at the unmanaged device;
in response to authenticating the user, cause the unmanaged device to send a request to establish a connection with a virtual browser instance running on a secure node; and
provide access to the service via the unmanaged device at least in part via the virtual browser instance running;
wherein the virtual browser instance comprises a secure and isolated instance of a browser software and the virtual browser instance is configured to access the service on behalf of the user, receive responsive data from the service, and stream to the unmanaged device content data comprising a subset of the responsive data.

20. A computer program product to provide access to a service, the computer program product being embodied in a non-transitory computer readable medium and comprising computer instructions for:
receiving via a communication interface a request from an unmanaged device to access a service;
authenticating a user associated with the request at least in part by prompting the user to use a managed device associated with the user to interact with data displayed at the unmanaged device;
in response to authenticating the user, causing the unmanaged device to send a request to establish a connection with a virtual browser instance running on a secure node; and
providing access to the service via the unmanaged device at least in part via the virtual browser instance running;
wherein the virtual browser instance comprises a secure and isolated instance of a browser software and the virtual browser instance is configured to access the service on behalf of the user, receive responsive data from the service, and stream to the unmanaged device content data comprising a subset of the responsive data.

21. The system of claim 1, wherein the authenticating the user associated with the request includes authenticating the user with respect to the service for which content data is received by the secure node.

22. The system of claim 1, wherein the processor is further configured to determine that the request to access the service is received from an unmanaged device in response to receiving the request and determining that the request was received other than via a secure tunnel.

23. The system of claim 1, wherein the virtual browser instance restrict a storage on the managed device of protected data comprised in the subset of responsive data.

24. The system of claim 1, wherein the streaming of the responsive data restricts a functionality of the unmanaged device with respect to protected data comprised in the subset of responsive data.

* * * * *